(12) United States Patent
Duda et al.

(10) Patent No.: US 9,799,361 B1
(45) Date of Patent: Oct. 24, 2017

(54) DUAL PURPOSE BOLOMETRIC SENSOR FOR HEAT-ASSISTED MAGNETIC RECORDING DEVICE

(71) Applicant: Seagate Technology LLC, Cupertino, CA (US)

(72) Inventors: John Charles Duda, Bloomington, MN (US); James Gary Wessel, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/391,125

(22) Filed: Dec. 27, 2016

Related U.S. Application Data

(63) Continuation of application No. 15/007,772, filed on Jan. 27, 2016, now Pat. No. 9,536,555.

(60) Provisional application No. 62/114,904, filed on Feb. 11, 2015.

(51) Int. Cl.
*G11B 5/02* (2006.01)
*G11B 5/60* (2006.01)
*G11B 5/00* (2006.01)
*G11B 5/48* (2006.01)

(52) U.S. Cl.
CPC .......... *G11B 5/6076* (2013.01); *G11B 5/4866* (2013.01); *G11B 5/6088* (2013.01); *G11B 2005/0021* (2013.01)

(58) Field of Classification Search
CPC ... G11B 5/6076; G11B 5/6052; G11B 5/6088; G11B 2005/0021; G11B 5/4866; G11B 5/3961; G11B 5/56; G11B 5/58; G11B 5/581; G11B 5/6011; G11B 5/607; G11B 5/6075; G11B 5/6035; G11B 5/012; G11B 5/341
USPC ..... 360/59, 75, 66, 67, 234, 234.3, 313, 328
See application file for complete search history.

(56) References Cited

U.S. PATENT DOCUMENTS

| | | | |
|---|---|---|---|
| 7,928,386 B2 * | 4/2011 | Frey | B82Y 20/00 250/336.2 |
| 8,705,323 B2 | 4/2014 | Contreras et al. | |
| 8,810,947 B1 | 8/2014 | Ren et al. | |
| 8,824,085 B2 | 9/2014 | Wilson et al. | |
| 8,842,507 B1 | 9/2014 | Hirano et al. | |
| 8,879,189 B2 | 11/2014 | Miyamoto et al. | |
| 8,908,483 B1 | 12/2014 | Ren et al. | |
| 9,030,773 B2 | 5/2015 | Macken et al. | |
| 9,042,210 B2 | 5/2015 | Macken | |
| 9,047,926 B2 | 6/2015 | Contreras et al. | |

(Continued)

OTHER PUBLICATIONS

U.S. Appl. No. 15/007,772, filed Jan. 27, 2016, Duda et al.

(Continued)

*Primary Examiner* — Nabil Hindi
(74) *Attorney, Agent, or Firm* — Hollingsworth Davis, LLC

(57) ABSTRACT

An apparatus comprises a slider and an optical waveguide formed in the slider and configured to receive light from a laser source. A near-field transducer (NFT) is formed on the slider at or near an air bearing surface (ABS) of the slider and optically coupled to the waveguide. A bolometric sensor is positioned proximate the NFT and exposed to at least some of the light. The bolometric sensor is configured to detect changes in output optical power of the laser source and contact between the slider and a magnetic recording medium.

20 Claims, 9 Drawing Sheets

(56) References Cited

U.S. PATENT DOCUMENTS

| | | |
|---|---|---|
| 9,153,272 B1 | 10/2015 | Rausch et al. |
| 9,177,577 B2 | 11/2015 | Macken et al. |
| 9,202,499 B2 | 12/2015 | Kiely et al. |
| 9,236,081 B1 | 1/2016 | Chu et al. |
| 9,558,774 B1 | 1/2017 | Macken |
| 2011/0299367 A1 | 12/2011 | Naniwa et al. |
| 2012/0051196 A1 | 3/2012 | Grobis et al. |
| 2013/0286802 A1 | 10/2013 | Kiely |
| 2014/0269238 A1 | 9/2014 | Kautzky et al. |
| 2015/0279430 A1 | 10/2015 | Trantham et al. |
| 2016/0104514 A1 | 4/2016 | Burnett et al. |
| 2016/0284372 A1 | 9/2016 | Duda et al. |
| 2017/0032810 A1 | 2/2017 | Macken et al. |

OTHER PUBLICATIONS

U.S. Appl. No. 15/342,326, filed Nov. 3, 2016, Duda et al.
U.S. Appl. No. 15/051,053, filed Feb. 23, 2016, Duda et al.
U.S. Appl. No. 15/370,975, filed Dec. 6, 2016, Macken et al.
U.S. Appl. No. 15/608,349, filed May 30, 2017, Duda et al.
File History for U.S. Appl. No. 15/342,326.

* cited by examiner

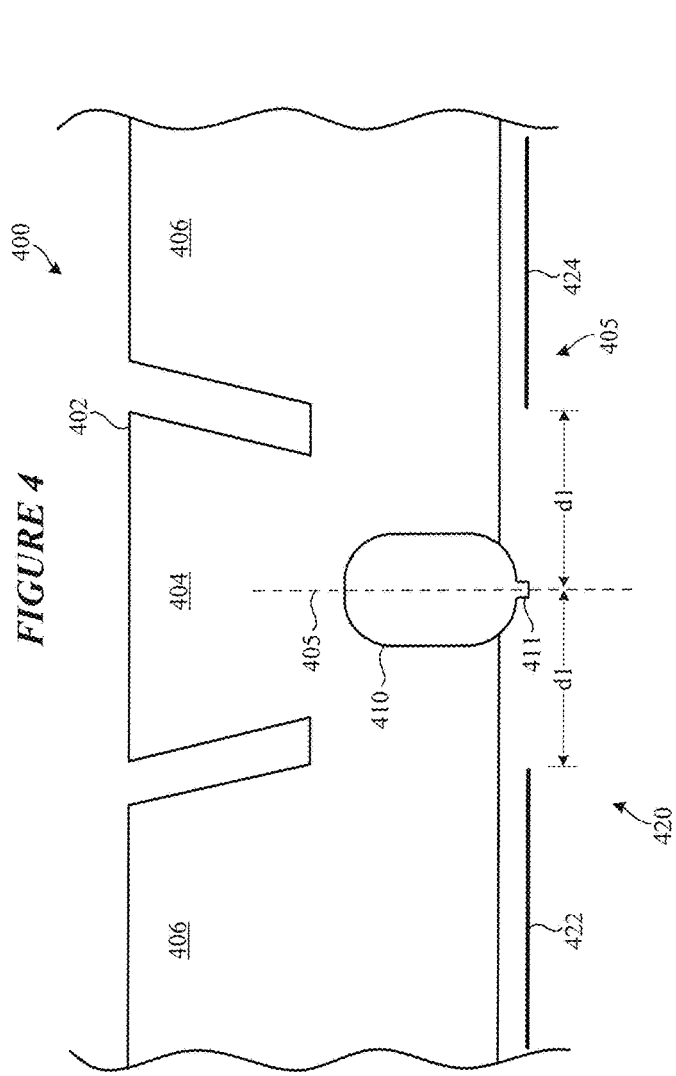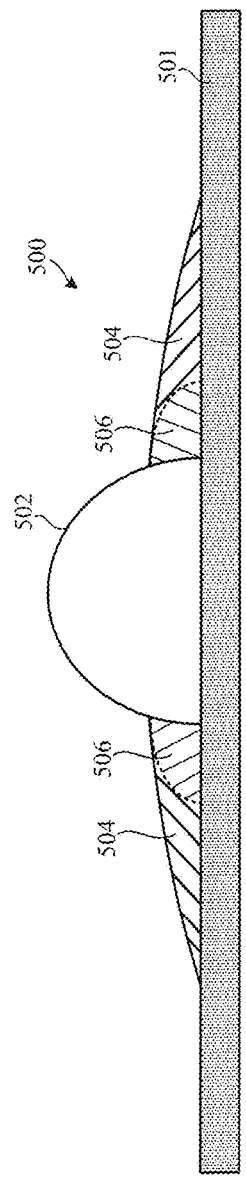

US 9,799,361 B1

DUAL PURPOSE BOLOMETRIC SENSOR FOR HEAT-ASSISTED MAGNETIC RECORDING DEVICE

RELATED PATENT DOCUMENTS

This application is a continuation of U.S. patent application Ser. No. 15/007,772, filed Jan. 27, 2016, which claims the benefit of Provisional Patent Application Ser. No. 62/114,904 filed on Feb. 11, 2015, to which priority is claimed pursuant to 35 U.S.C. §119(e), and which are incorporated herein by reference in their entireties.

SUMMARY

Embodiments of the disclosure are directed to an apparatus comprising a slider and an optical waveguide formed in the slider and configured to receive light from a laser source. A near-field transducer (NFT) is formed on the slider at or near an air bearing surface (ABS) of the slider and optically coupled to the waveguide. A bolometric sensor is positioned proximate the NFT and exposed to at least some of the light. The bolometric sensor is configured to detect changes in output optical power of the laser source and contact between the slider and a magnetic recording medium.

Some embodiments are directed to an apparatus comprising a slider, an optical waveguide formed in the slider and configured to receive light from a laser source, and a write pole at or near an air bearing surface (ABS) of the slider. A near-field transducer (NFT) is formed on the slider at or near the ABS and optically coupled to the waveguide. The NFT is positioned adjacent the write pole. A bolometric sensor is positioned proximate the NFT and exposed to at least some of the light. The bolometric sensor is configured to detect changes in output optical power of the laser source and contact between the slider and a magnetic recording medium. The bolometric sensor is situated at or immediately adjacent to a thermally actuatable region of the slider that includes the write pole and the NFT.

BRIEF DESCRIPTION OF THE DRAWINGS

FIG. 4 illustrates a region of a slider which includes a multi-function sensor situated proximate a near-field transducer in accordance with various embodiments;

FIG. 5 illustrates a portion of a magnetic recording medium on which a hotspot has been created by a near-field transducer, such as the near-field transducer shown in FIG. 4;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
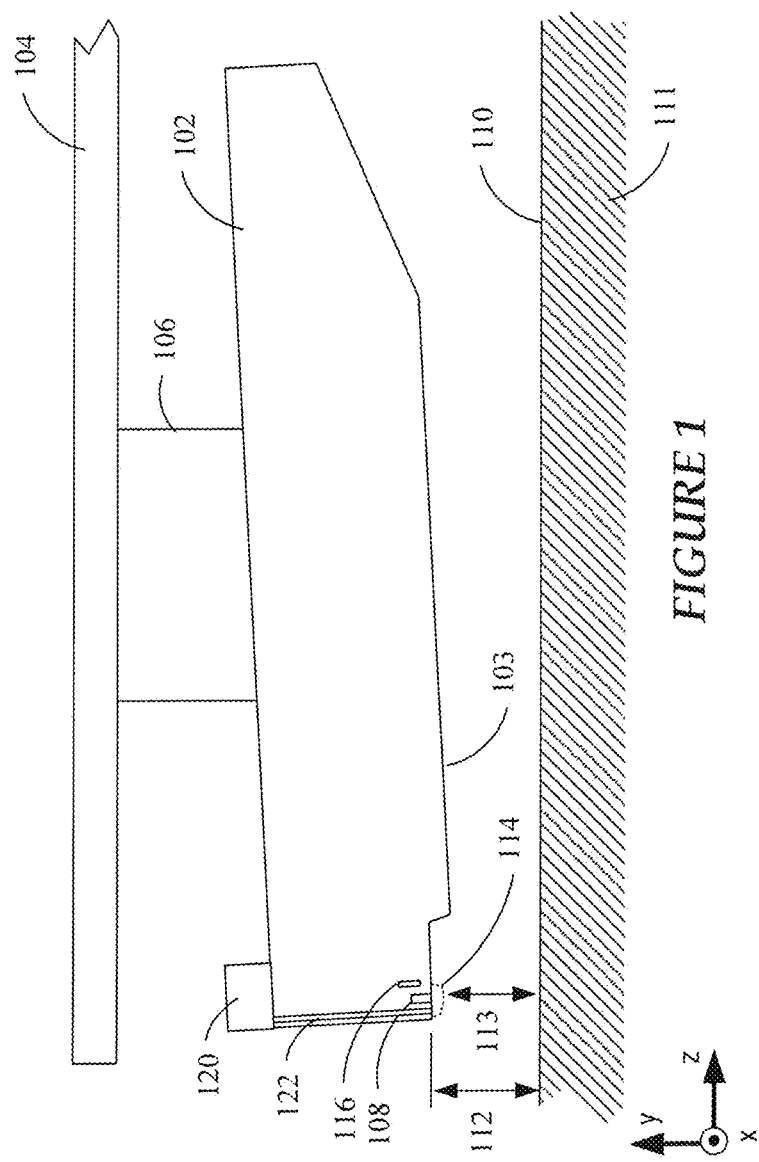
FIG. 1 is a schematic representation of a slider in which the various embodiments disclosed herein may be implemented.

The present disclosure generally relates to head-to-medium spacing/contact detection and laser power monitoring in data storage devices that employ heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

Generally, recording heads may utilize heaters for fine control of head-to media spacing. The heaters heat a portion of the recording head that faces a recording medium. The heating causes a local protrusion due to thermal expansion of the material. Thermal protrusion can be finely controlled to maintain a desired clearance between read/write transducers and the recording medium. The regions subject to thermal protrusion control typically include a region proximate the writer and, in some implementations, a region proximate the reader. Each of these regions, when thermally activated, becomes a so-called close point relative to the recording medium.

In order to establish an appropriate or optimal dynamic clearance for the read/write transducer, it is desirable to measure fly height at the close point or points, since these regions are closest to the recording medium when thermally actuated. Further, while conventional read/write transducers may be allowed to contact the recording medium under some conditions, a HAMR device may be damaged if such contact occurs while recording. This can make the estimation and control of head-to-medium spacing (e.g., dynamic clearance) more difficult in a HAMR recording head. The introduction of optical components to the read/write transducer in HAMR devices, however, complicates head-to-medium spacing and contact detection due to the physical presence and heat generated by the optical components.

For example, in HAMR recording transducers, the location of a fly height sensor is restricted to areas outside of the optical path in order to ensure light delivery to the NFT is not degraded by the presence of the fly height sensor. Ideally, any sensor designed for head-disk interaction would be at the close point of the recording transducer, which for current HAMR transducers is preferably at the NFT and write pole.

However, due to the requirement that the fly height sensor must not compromise light delivery, fly height sensors are typically spaced more than 1 μm from the NFT and write pole.

A HAMR drive generally uses a laser diode to heat the recording medium to aid in the recording process. The laser diode generates heat and is also heated by other components (writer, reader, heater elements) in the magnetic slider. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping/power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits.

Monitoring of laser power is important to ensure proper operation of the laser diode and to avoid instabilities such as mode hopping. Conventional laser power monitoring involves use of an external photodiode situated on a submount that also supports the laser diode. The photodiode senses optical power output of the laser diode, and can be used to determine if the laser performance is sufficiently stable to ensure adequate writing performance. However, future integrated HAMR recording transducers will not be able to include an external photodiode due to reduced submount dimensions.

Adequate head-medium contact detection response remains critical to hard drive development. For HAMR hard drives, it is also critical to detect small fluctuations in laser output optical power delivered to the NFT while minimizing any light delivery losses. Typically, an electrical element such as an internal laser power monitor (e.g., photodiode) would require extra, dedicated electrical bond pads. Since additional bond pads add cost and complexity to the head gimbal assembly, it is desirable to provide both sensing of head-medium interactions and laser output optical power without the need for additional bond pads.

Embodiments of the disclosure are directed to a sensor arrangement that can be used to detect head-to-medium spacing and contact and, in addition, be used to monitor output optical power of the laser diode. Embodiments are directed to a single sensor that can perform the dual functions of sensing head-to-medium spacing/contact and output optical power of the laser diode. Embodiments are directed to a dual function sensor that can be situated at or immediately adjacent the writer close point. Embodiments of the disclosure are directed to a dual function sensor that can be situated in the light path of the slider yet have substantially no or only negligible impact on performance of the near-field transducer. Embodiments are directed to a dual function sensor that can harvest waste light that would otherwise exit the slider and improve compactness of the heated spot created on the magnetic disk. Embodiments are directed to a dual function sensor implemented as a single, unified device that requires only one set of electrical bond pads, does not degrade light path efficiency due to its location downstream of the NFT, and demonstrates unique approaches to crossing the light path either through a series connection via existing electrically conductive structures or by forming out-and-back geometries.

According to various embodiments, a bolometric sensor can be situated adjacent the near-field transducer so that light produced by the laser diode impinges on the bolometric sensor. The bolometric sensor can be situated in or near the optical light path of the slider so that it absorbs waste light that would otherwise exit the slider and cause unwanted heating of the magnetic disk adjacent the hotspot created by the near-field transducer. In various embodiments, the bolometric sensor comprises a thin metallic element with a high thermal coefficient of resistance (TCR) that is embedded in the slider of a read/write transducer near the optical light path. The bolometric sensor is preferably situated at or near the air bearing surface (ABS) of the slider so that it can sense for changes in temperature resulting from changes in head-to-medium spacing and contact.

When a small bias current is applied across the bolometric sensor, any change in bolometric sensor temperature will create a corresponding change in measured voltage. As a result, the bolometric sensor can be used to monitor head-medium interactions due to the fact that the ABS heat transfer coefficient changes as a read/write transducer approaches a spinning disk. The bolometric sensor can also be used to monitor fluctuations in laser output optical power that cause fluctuations in absorption and temperature in the bolometric sensor. In general, a bolometer-based internal power monitor must not decrease light path efficiency while still absorbing enough light to create a sufficiently large signal for detection. Moreover, it is desirable that the bolometric sensor not require any additional bond pads and would ideally be wired in series or parallel with an existing sensor of the recording transducer. A bolometric sensor of the present disclosure can be implemented as a single device that can be used for both head-medium contact detection and laser power monitoring, that maintains extreme proximity to the mechanical close point, and does not in any significant way degrade the light path or optics.

Referring now to FIG. 1, a block diagram shows a side view of a read/write transducer 102 according to a representative embodiment. The read/write transducer 102 may be used in a magnetic data storage device, e.g., hard drive. The read/write transducer 102 may also be referred to herein as a slider, read head, recording head, etc. The read/write transducer 102 is coupled to an arm 104 by way of a suspension 106 that allows some relative motion between the read/write transducer 102 and arm 104. The read/write transducer 102 includes read/write transducers 108 at a trailing edge that are held proximate to a surface 110 of a magnetic recording medium 111, e.g., magnetic disk. The read/write transducer 102 is configured as a HAMR recording head, which includes a laser 120 (or other energy source) and a waveguide 122. The waveguide 122 delivers light from the laser 120 to components near the read/write transducers 108.

When the read/write transducer 102 is located over surface 110 of recording medium 111, a flying height 112 is maintained between the read/write transducer 102 and the surface 110 by a downward force of arm 104. This downward force is counterbalanced by an air cushion that exists between the surface 110 and an air bearing surface 103 (also referred to herein as a "media-facing surface") of the read/write transducer 102 when the recording medium 111 is rotating. It is desirable to maintain a predetermined slider flying height 112 over a range of disk rotational speeds during both reading and writing operations to ensure consistent performance. Region 114 is a "close point" of the read/write transducer 102, which is generally understood to be the closest spacing between the read/write transducers 108 and the magnetic recording medium 111, and generally defines the head-to-medium spacing 113. To account for both static and dynamic variations that may affect slider flying height 112, the read/write transducer 102 may be configured such that a region 114 of the read/write transducer 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116.

Figure 2:
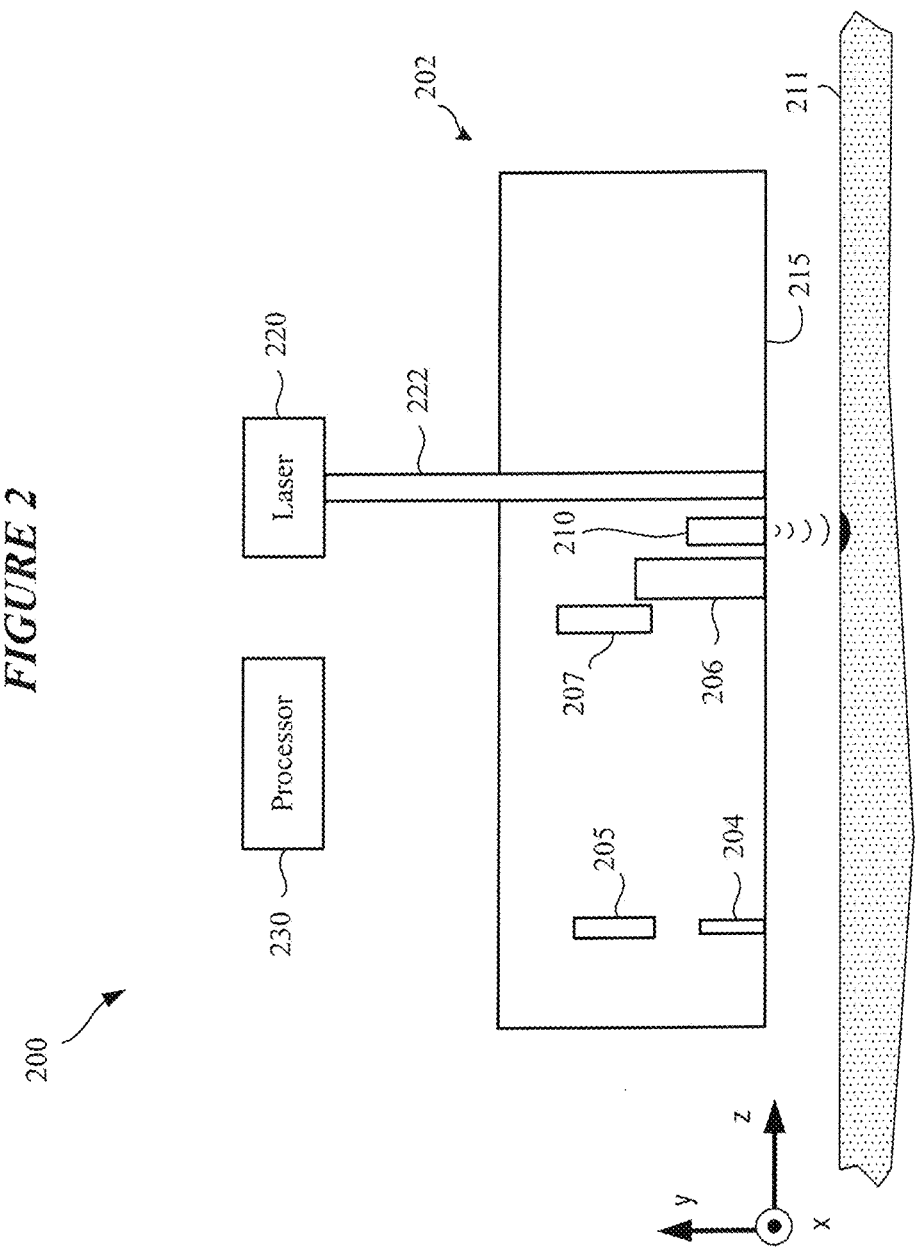
FIG. 2 shows a recording head arrangement in accordance with various embodiments.

FIG. 2 shows a recording head arrangement 200 in accordance with various embodiments. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent an NFT 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211.

Figure 3:
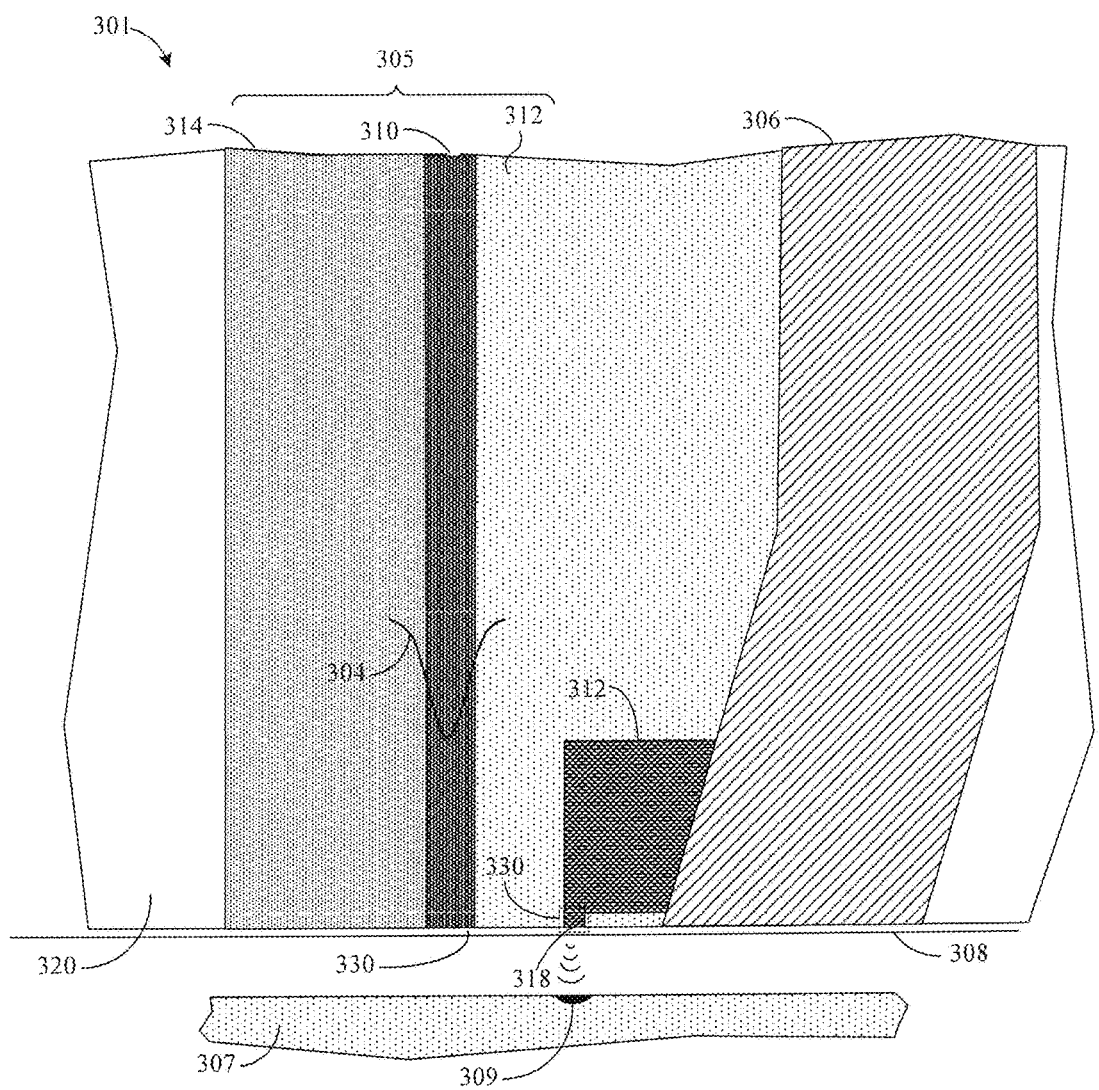
FIG. 3 is a cross-sectional view illustrating portions of a slider body proximate a near-field transducer according to a representative embodiment.

In FIG. 3, a cross-sectional view illustrates portions of the slider body 301 near the near-field transducer 312 according to a representative embodiment. In this view, the NFT 312 is shown proximate the ABS 308 of the slider body 301 and to a surface of magnetic recording medium 307, e.g., a magnetic disk. The NFT 312 shown in FIG. 3 is of an NTS (near-field transducer stadium style) design which includes an enlarged region having a sloped planar upper surface. It is noted that NFT 312 can be of a different design, such as a so-called lollipop or peg-only (e.g., nanorod) design, for example. A peg 318 extends from the lower portion enlarged region and terminates near or at the ABS 318. A waveguide 305 delivers electromagnetic energy from a laser diode (e.g., see laser 120 in FIG. 1) to the near-field transducer 312, which directs the energy to create a small hotspot 309 on the recording medium 307. The waveguide 305 comprises a layer of core material 310 surrounding by cladding layers 312 and 314. A magnetic write pole 306 causes changes in magnetic flux near the media facing surface 308 in response to an applied current. Flux from the write pole 306 changes a magnetic orientation of the hotspot 309 as it moves past the write pole 306 in the downtrack direction (z-direction). FIG. 3 also shows a bolometric sensor 330 situated at the ABS 308 adjacent to, but spaced apart from, the NFT 312.

Turning now to FIG. 4, there is illustrated a region 400 of a slider which includes a multi-function sensor 420 situated proximate an NFT 410 in accordance with various embodiments. The region 400 of the slider shown in FIG. 4 includes structure 402 surrounding the NFT 410, which includes a diffuser region 404 and heat channel regions 406 that can be made out of electrically conductive material. The NFT 410 includes a peg 411 positioned at or near the ABS 405 of the slider. A bolometric sensor 420 is situated at the ABS 405 and positioned in a spaced-apart relationship with respect to the NFT 410. In the illustrative example shown in FIG. 4, the bolometric sensor 420 includes a first bolometric sensor 422 and a second bolometric sensor 422, each of which is spaced from a centerline 405 of the NFT 410 by a distance, d1. All or at least a portion of the first and second bolometric sensors 422 and 424 extends into the optical path so that light produced by the laser diode impinges on the first and second bolometric sensors 422 and 424. The first and second bolometric sensors 422 and 424 are positioned on the slider so that laser light impinging on the sensors 422 and 424 is waste light that would otherwise exit the ABS 405.

The first and second bolometric sensors 422 and 424 approach the centerline 405 of the NFT 410 from opposing directions along the ABS 405 and terminate at a distance d1 spaced from the centerline 405. As discussed above, the terminal ends of the first and second bolometric sensors 422 and 424 are spaced apart from the NFT 410 so as to absorb waste light that would otherwise exit the slider and impinge on the surface of the adjacent magnetic recording medium. Importantly, the first and second bolometric sensors 422 and 424 are positioned relative to the NFT 410 so that the sensors 422 and 424 do not degrade the light path or optics within the slider. In this regard, the first and second bolometric sensors 422 and 424 have no or only a negligible impact on the performance of the NFT 410. For example, the first and second bolometric sensors 422 and 424 can be positioned relative to the NFT 410 so that only a small increase (e.g., 5% or less) in the temperature at the peg 411 of the NFT 410 results, if at all.

According to various embodiments, the terminal ends of the first and second bolometric sensors 422 and 424 can be spaced apart from the centerline 405 of the NFT 410 by a distance, d1, of between about 350 nm and 1 μm. In some embodiments, the terminal ends of the first and second bolometric sensors 422 and 424 can be spaced apart from the centerline 405 of the NFT 410 by a distance, d1, of between about 500 nm and 1 μm. In other embodiments, the terminal ends of the first and second bolometric sensors 422 and 424 can be spaced apart from the centerline 405 of the NFT 410 by a distance, d1, of between about 350 nm and 500 nm. Positioning the first and second bolometric sensors 422 and 424 in a spaced relationship with respect to the NFT 410 on the order of between about 350 nm and 1 μm provides sufficient absorption of light to create a sufficiently large signal for detecting laser output optical power and changes thereof, with no or only negligible adverse impact on NFT performance. A bias current on the order of 1 mA is expected to produce a detectable voltage drop associated with a 1% fluctuation in laser output optical power.

Positioning the bolometric sensor 420 in close proximity to the NFT 410 provides for sensing of fly height changes of the slider at or immediately adjacent the write close point of the slider. Because the bolometric sensor 420 is positioned immediately adjacent the NFT 410, and because the NFT 410 and is positioned immediately adjacent the write pole (e.g., within about 10 to 100 nm), the dual function bolometric sensor 420 can provide for highly accurate fly height measurements for the write close point of the slider.

FIG. 5 illustrates a portion of a magnetic recording medium 501 on which a hotspot 500 has been created by an NFT, such as NFT 410 shown in FIG. 4. The hotspot 500 includes a primary hotspot 502 created by the peg 411 of the NFT 410 shown in FIG. 4. Surrounding the primary hotspot 502 is a secondary hotspot 504 created by waste light exiting the ABS 405 near the NFT 410. The waste light emanating from the ABS 405 causes background heating of the medium adjacent the primary hotspot 502. This background heating of the medium 501 causes undesirable enlargement of the primary hotspot 502 beyond desired dimensions of the primary hotspot 502. Enlargement of the primary hotspot 502 beyond desired dimensions can result in unintended heating of and writing to/erasure of medium locations adjacent the primary hotspot 502 (e.g., such as neighboring magnetic domains or bits). The bolometric sensor 420 advantageously harvests waste light that would otherwise result in background heating of the recording medium surrounding the primary hotspot 502. As a result, the enlarged region 504 adjacent the primary hotspot 502 is significantly reduced in size (to that of region 506, for example) due to absorption of waste light by the bolometric sensor 420.

Figure 6A:
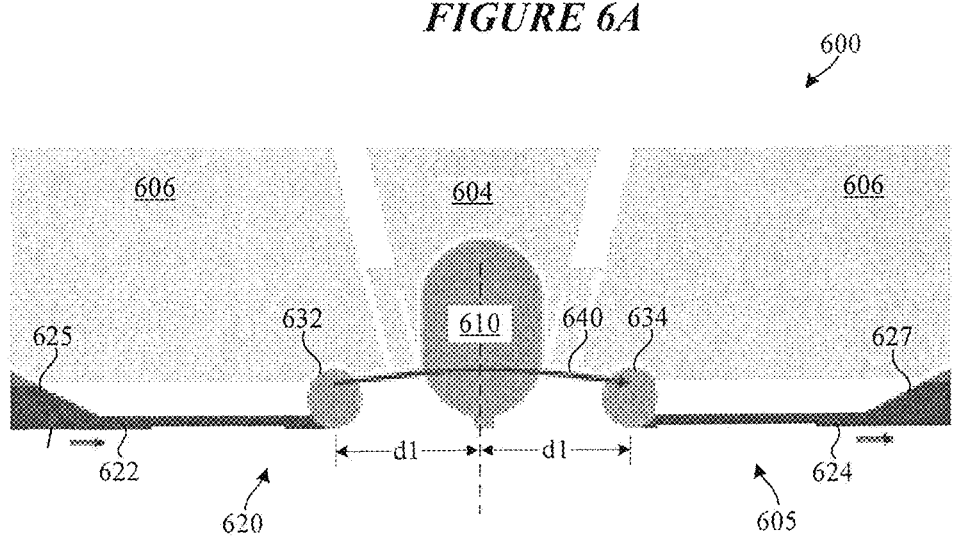
FIGS. 6A and 6B illustrate a bolometric sensor situated proximate a near-field transducer in accordance with various embodiments.
Figure 6B:
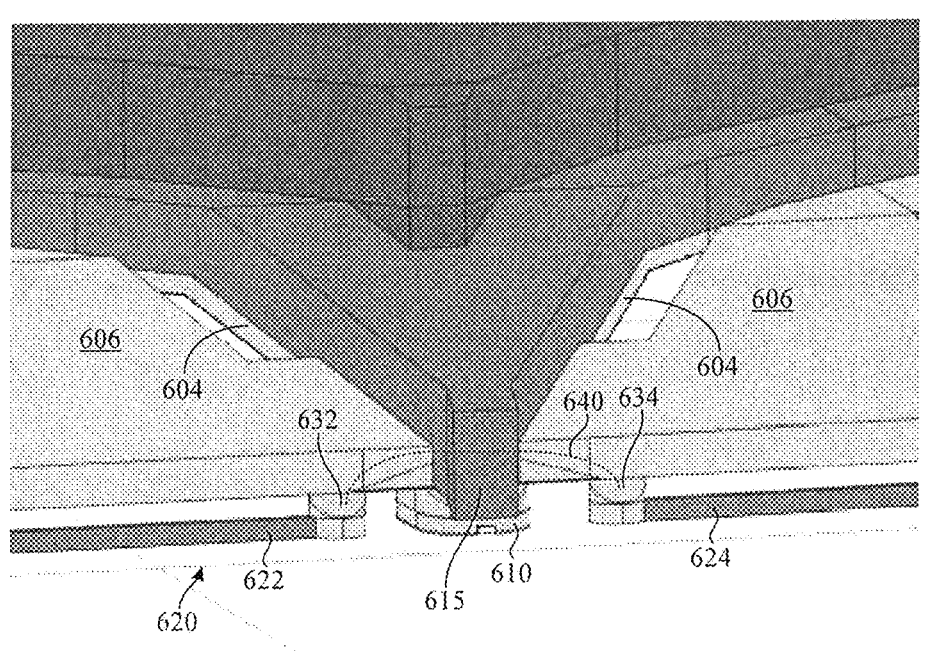

FIGS. 6A and 6B illustrate a region 600 of a slider that includes a bolometric sensor 620 situated proximate an NFT 610 in accordance with various embodiments. FIG. 6A is a simplified view of the slider region 600 which excludes the write pole for purposes of clarity of illustration. FIG. 6B is a perspective view of the slider region 600 which includes the write pole 615 proximate an NFT 610. The NFT 610 is shown as a stadium-style near-field transducer, it being understood that a lollipop, nanorod, or other NFT configuration can be used. The portion 600 of the slider shown in FIGS. 6A and 6B is similar to that shown in FIG. 4, and includes a diffuser region 604 and heat channel regions 606. The bolometric sensor 620 is shown to include a pair of wire sensors 622 and 624 formed from a metal having a relatively high TCR. Suitable metals include W, Ru, Cr, NiFe, etc. Generally, a TCR value of 1.5e-3° C.$^{-1}$ or higher is preferred, although operating conditions can be changed to accommodate a lower TCR value. That is, the measurable signal is proportional to the bias current times the TCR times the change in temperature times the intrinsic resistance of the sensor (I*TCR*dT*R$_O$) such that a slightly higher bias current can be applied or a higher intrinsic resistance can be designed to compensate for a lower TCR.

In the embodiment shown in FIGS. 6A and 6B, a first wire sensor 622 extends between an electrical lead 625 and a first via 632. A second wire sensor 624 extends between an electrical lead 627 and a second via 634. The first and second wire sensors 622 and 624 extend along the ABS 605 of the slider. The first and second vias 632 and 634 define electrically conductive pathways to structures of the slider surrounding the NFT 610 and situated away from the ABS 605. In particular, the first and second vias 632 and 634 extend to electrically conductive structures 640 (e.g., Au structures) proximate the NFT 610 that allow current to travel (as indicated by arrows) between the first and second vias 632 and 634. In this regard, the bolometric sensor 620 has a bridged configuration, since part of the slider structure provides an electrically conductive bridge that electrically couples the first and second wire sensors 622 and 624. As such, an electrically conductive circuit is formed between the first wire sensor 622, the first via 632, the electrically conductive structure pathway 640, the second via 634, and the second wire sensor 624.

The first and second wire sensors 622 and 624 are respectively connected to first and second electrical leads 625 and 627, which are connected to electrical bond pads of the recording transducer as will be described below. The first and second wire sensors 622 and 624 can have a length of about 1 to 10 μm. The first and second leads 625 and 627 are preferably formed from a material having a low or zero TCR. However, so long as the intrinsic resistance (R$_O$) of the leads is much smaller than that of the sensor, a low or zero TCR material may not be necessary. Other sections of the electrical circuit in addition to the first and second leads 625 and 627 are preferably formed from a low or zero TCR material. Use of low or zero TCR electrical leads and/or electrical leads with low intrinsic resistance insures that signals generated by the first and second wire sensors 622 and 624 are largely or entirely due to temperature changes in the vicinity of the NFT 610, and not from neighboring structures of the slider.

Figure 7A:
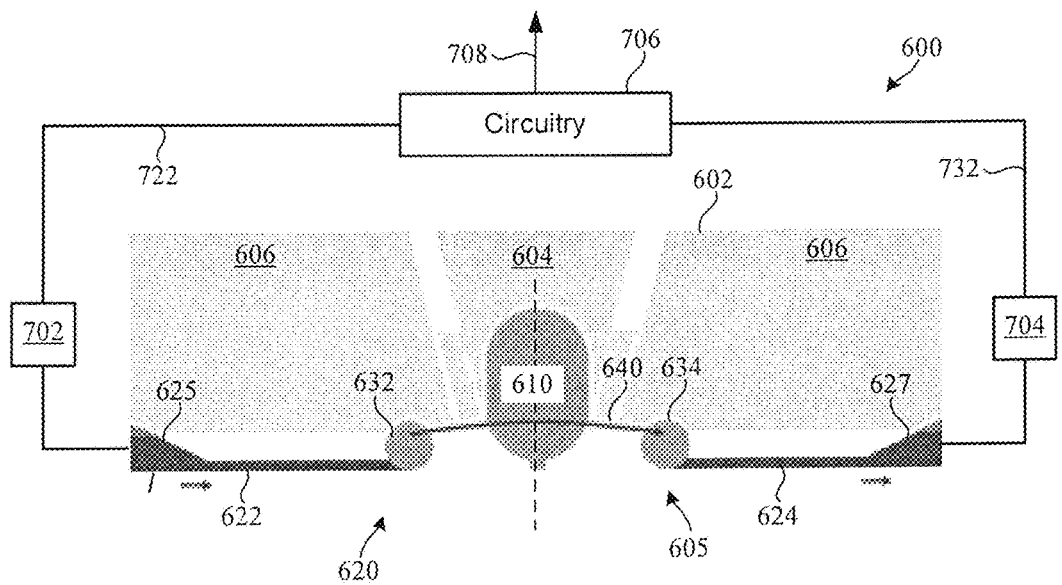
FIG. 7A illustrates the portion of the slider shown in FIGS. 6A and 6B, with additional circuitry coupled to the bolometric sensor in accordance with various embodiments.

FIG. 7A illustrates the portion 600 of the slider shown in FIGS. 6A and 6B with additional circuitry coupled to the bolometric sensor 620 in accordance with various embodiments. The electrical circuit shown in FIG. 7A includes the first wire sensor 622 connected to the first lead 625, and the first lead 625 coupled to a first bond pad 702. The second wire sensor 624 is shown connected to the second lead 627, and the second lead 627 is shown coupled to a second bond pad 704. The first and second bond pad 702 and 704 are respectively coupled to bias sources (not shown) and to circuitry 706 via conductors 722 and 732 respectively. The first and second bond pads 702 and 704 can be bond pads designated for a fly height or contact sensor, for example. Provision of a dual function bolometric sensor 620 allows a single pair of bond pads to be used for a single sensor that performs both fly height sensing/contact detection and laser output optical power monitoring, thereby obviating the need for a second pair of bond pads (e.g., one pair of bond pads for contact detection sensor and a second pair of bond pads for laser power monitoring).

In some embodiments, a single pair of bond pads 702 and 704 can be shared between different components of the recording transducer. For example, the bond pads 702 and 704 can be connected to the reader and to the bolometric sensor 620 (with other components as appropriate). Since the reader need not be powered during write operations, the bolometric sensor 620 can be active when reading is not occurring, such as during write operations when the NFT 610 is active. Laser power monitoring and/or fly height measurements/contact detection can be conducted during periods when the reader is not active, for example.

The circuitry 706 is configured to communicate a signal 708 indicative of slider flying height/contact and/or laser output optical power and changes thereof to other electrical or electronic components of the hard drive (e.g., a processor or controller). In some embodiments, fly height measurements and contact detection can occur at times when laser power monitoring is not being conducted, and vice versa. Performing these measurements at different times allows for easy determination as to the origin of the signals produced by the circuitry 706. In some embodiments, fly height measurements/contact detection and laser power monitoring can be conducted at the same time, and the circuitry 706 can be configured to discriminate between signals produced from fly height measurements/contact detection and those produced from laser power monitoring.

Figure 7B:
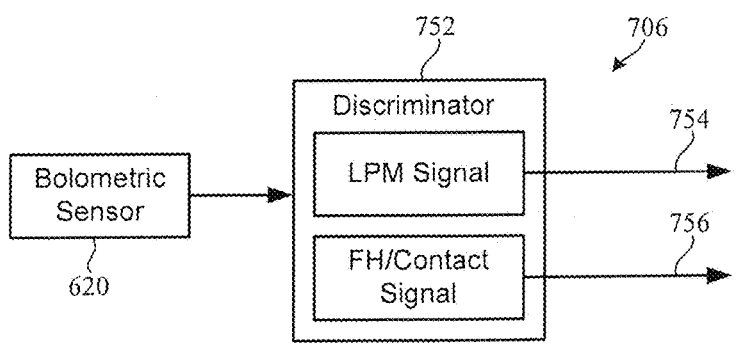
FIG. 7B illustrates an embodiment of circuitry which includes a discriminator that receives signals from a bolometric sensor in accordance with various embodiments.

FIG. 7B illustrates an embodiment of circuitry 706 which includes a discriminator 752 that receives signals from the bolometric sensor 620. The discriminator 752 is configured to discriminate signals produced by the bolometric sensor 620 when performing laser power monitoring and when performing fly height and contact detection measurements. The discriminator 752 can perform discrimination of both signal types concurrently or sequentially. Typically, the bolometric sensor signal has relatively high frequency components when performing laser power monitoring, and relatively low-frequency components when performing fly height and contact detection measurements. For example, the bolometric sensor signal can have frequency components in the megahertz range when performing laser power monitoring, and frequency components in the kilohertz range or lower when performing fly height and contact detection measurements. The discriminator 752 can include a high pass or bandpass filter for extracting bolometric sensor signal content associated with laser power monitoring. The discriminator 752 can include a low pass or bandpass filter for extracting bolometric sensor signal content associated with fly height and contact detection measurements. In some implementations, the discriminator 752 can include a detector configured to detect amplitude spikes in the bolometric sensor signal indicative of contact between the slider and the recording medium.

Figure 8A:
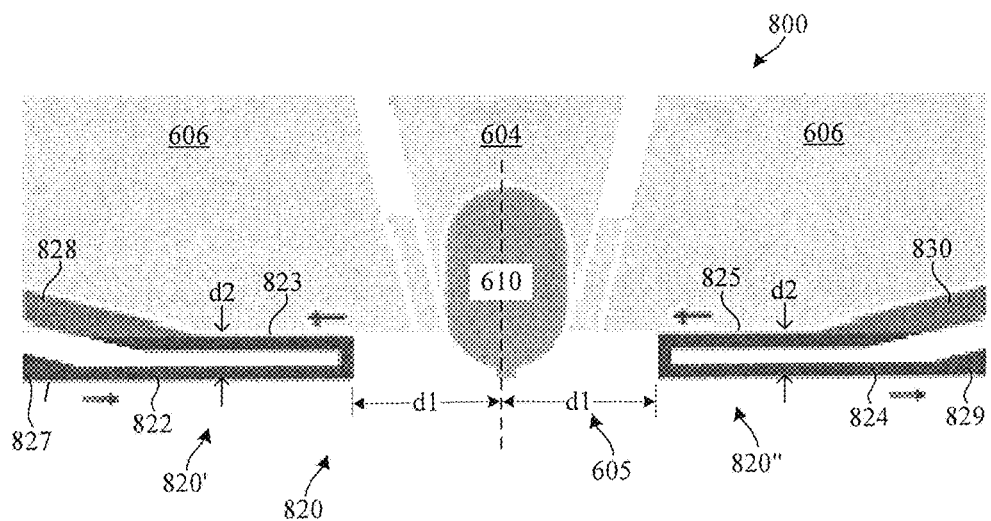
FIGS. 8A and 8B illustrate a bolometric sensor situated proximate a near-field transducer in accordance with various embodiments.
Figure 8B:
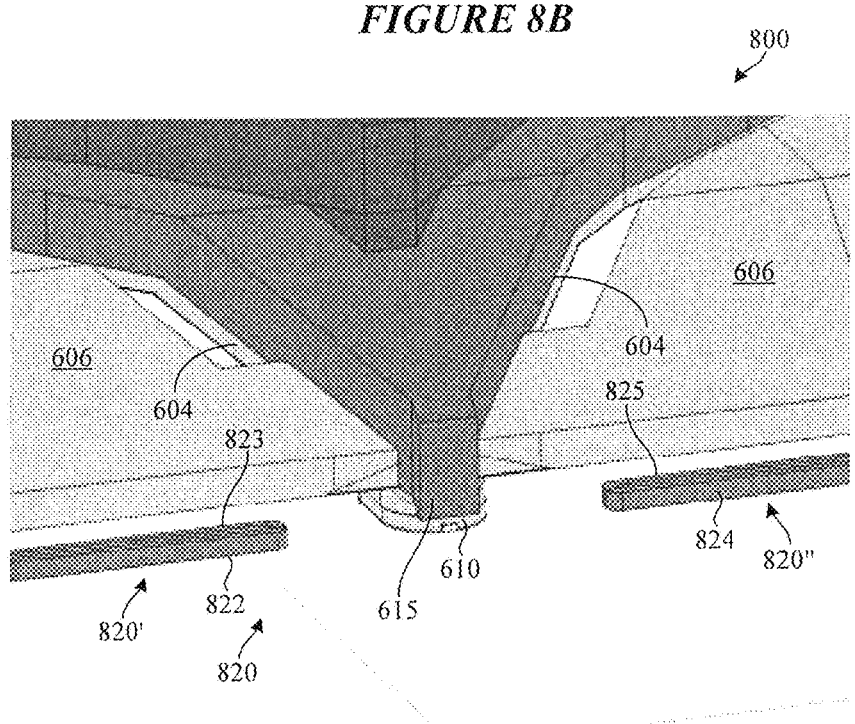

FIGS. 8A and 8B illustrate a region 800 of a slider that includes a bolometric sensor 820 situated proximate an NFT 610 in accordance with various embodiments. FIG. 8A is a simplified view of the slider region 600 which excludes the write pole for purposes of clarity of illustration. FIG. 8B is a perspective view of the slider region 600 which includes the write pole 615 proximate an NFT 610. The NFT 610 is shown as a stadium-style near-field transducer for purposes of illustration and not of limitation. The portion 800 of the slider shown in FIGS. 8A and 8B is similar to that shown in FIGS. 4-7, and includes a diffuser region 604 and heat channel regions 606. The bolometric sensor 820 shown in FIGS. 8A and 8B has a hairpin configuration (e.g., elongated looped configuration forming a hairpin), comprising first and second wire sensors 820' and 820" that approach the NFT 610 from opposing directions and turn back on themselves to form a pair of hairpin sensors. At a location away from the ABS 605 and out of the optical path, these two hairpin shaped wire sensors 820' and 820" can be connected in series or parallel with each other.

The first and second wire sensors 820' and 820" are preferably formed from a metal having a relatively high TCR. The first sensor wire 820' includes a first wire 822 spaced apart and arranged in parallel with a second wire 823. The first and second wires 822 and 823 can be spaced apart from one another by about 150 nm (i.e. have a pitch, d2, of 150 nm). The first and second wires 822 and 823 of the first wire sensor 820 are respectively connected to first and second electrical leads 827 and 828. The second sensor wire 820" includes a first wire 824 spaced apart and arranged in parallel with a second wire 825. The first and second wires 824 and 825 can be spaced apart from one another by about 150 nm. The first and second wires 824 and 825 are respectively connected to first and second electrical leads 829 and 830. The wires 822-825 of the first and second wire sensors 820' and 820" can have a length of about 1 to 10 µm. The electrical leads 827-830 are preferably formed from a material having a low or zero TCR. Other sections of the electrical circuit in addition to the electrical leads 827-830 are preferably formed from a low or zero TCR material.

Figure 9:
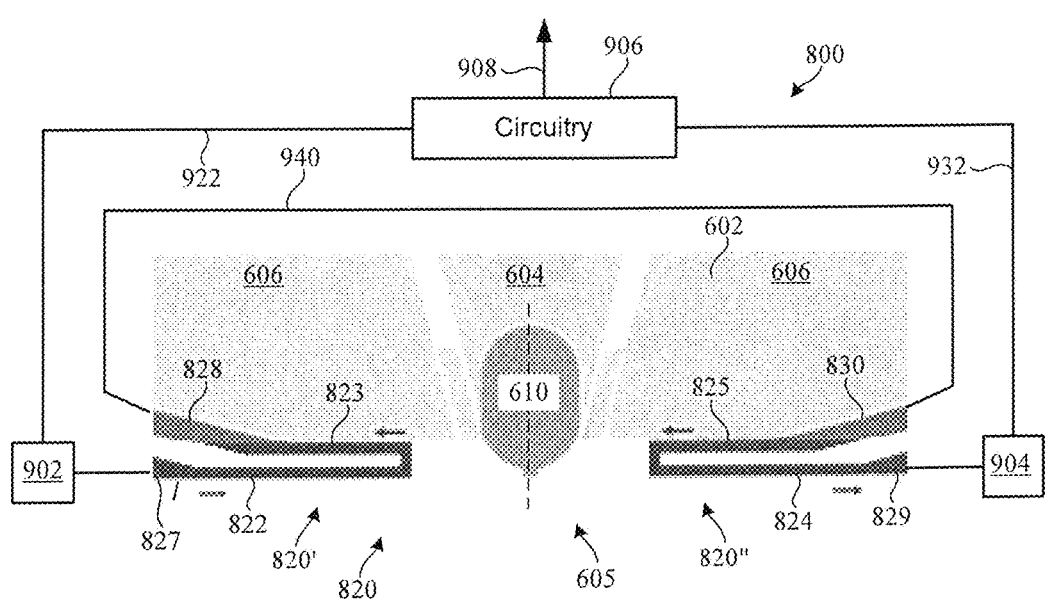
FIG. 9 illustrates the portion of the slider shown in FIGS. 8A and 8B, with additional circuitry coupled to the bolometric sensor in accordance with various embodiments.

FIG. 9 illustrates the portion 800 of the slider shown in FIGS. 8A and 8B with additional circuitry coupled to the bolometric sensor 820 in accordance with various embodiments. The electrical circuit shown in FIG. 9 includes first and second wires 822 and 823 of a first wire sensor 820' respectively connected to first and second leads 827 and 828. The electrical circuit also includes first and second wires 824 and 825 of a second wire sensor 820" respectively connected to first and second leads 829 and 830. The first lead 827 couples the first wire sensor 820' to electrical bond pad 902, and the first lead 829 couples the second wire sensor 820" to the electrical bond pad 904. The first and second wire sensors 820' and 820" are coupled in series via conductor 940 respectively connected to second leads 828 and 830. Circuitry 906 is coupled to the first and second bond pads 902 and 904 via conductors 922 and 932, respectively.

The circuitry 906 is configured to communicate a signal 908 indicative of slider flying height/contact and/or laser output optical power and changes thereof to other electrical or electronic components of the hard drive. In some embodiments, fly height measurements and contact detection can occur at times when laser power monitoring is not being conducted, and vice versa. In some embodiments, the circuitry 906 can be configured to discriminate between signals produced from fly height measurements/contact detection and those produced from the laser power monitoring in a manner previously discussed. The bolometric sensors 820' and 820" can be connected to bond pads 902 and 904 exclusively or in a bond pad sharing relationship with one or more other components of the recording transducer.

Figure 10:
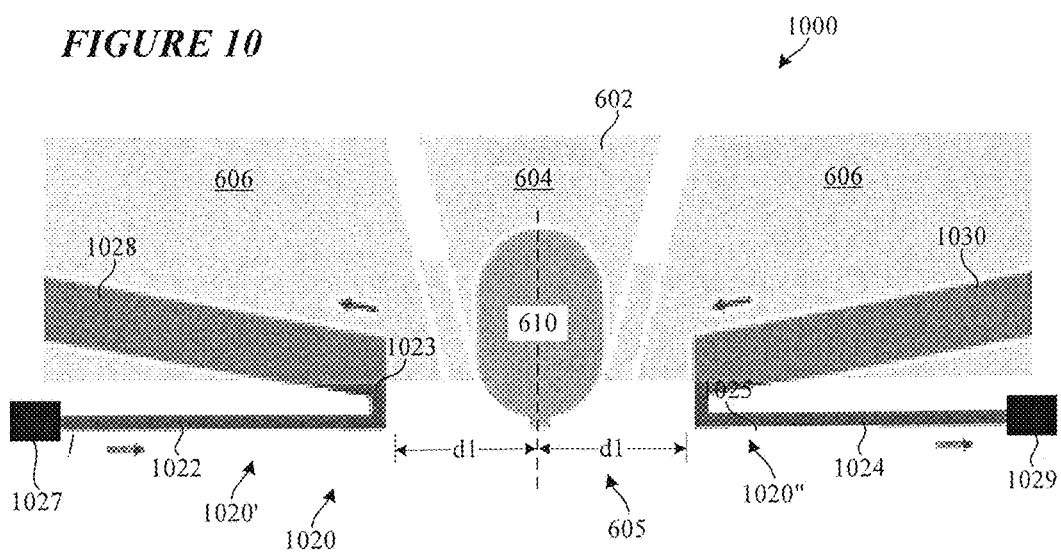
FIG. 10 illustrates a bolometric sensor situated proximate a near-field transducer in accordance with various embodiments.

FIG. 10 illustrates a region 1000 of a slider that includes a bolometric sensor 1020 situated proximate an NFT 610 in accordance with various embodiments. The NFT 610 is shown as a stadium-style near-field transducer for purposes of illustration and not of limitation. The portion 1000 of the slider shown in FIG. 10 is similar to that shown in FIGS. 4-9, and includes a diffuser region 604 and heat channel regions 606. The bolometric sensor 1020 shown in FIG. 10 has a wishbone configuration (e.g., elongated looped configuration forming a wishbone), comprising first and second wire sensors 1020' and 1020" that approach the NFT 610 from opposing directions and turn back on themselves to form a pair of wishbone shaped sensors. The wishbone sensor configuration is similar to the hairpin configuration shown in FIGS. 8 and 9, but may ease required critical dimensions. At a location away from the ABS 605 and out of the optical path, these two wishbone shaped wire sensors 1020' and 1020" can be connected in series or parallel with each other.

The first and second wire sensors 1020' and 1020" are preferably formed from a metal having a relatively high TCR. The first sensor wire 1020' includes a first wire 1022 spaced apart and arranged at an acute angle (e.g., less than 45°) with respect to a second wire 1023. The first and second wires 1022 and 1023 can be spaced apart from one another by at least 150 nm as a minimum dimension. The first and second wires 1022 and 1023 of the first wire sensor 1020' are respectively connected to first and second electrical leads 1027 and 1028. The second sensor wire 1020" includes a first wire 1024 spaced apart and arranged at an acute angle (e.g., less than 45°) with respect to a second wire 1025. The first and second wires 1024 and 1025 can be spaced apart from one another by about 150 nm as a minimum dimension. The first and second wires 1024 and 1025 are respectively connected to first and second electrical leads 1029 and 1030. The wires 1022-1025 of the first and second wire sensors 1020' and 1020" can have a length of about 1 to 10 µm. The electrical leads 1027-1030 are preferably formed from a material having a low or zero TCR. Other sections of the electrical circuit in addition to the electrical leads 1027-1030 are preferably formed from a low or zero TCR material.

Figure 11:
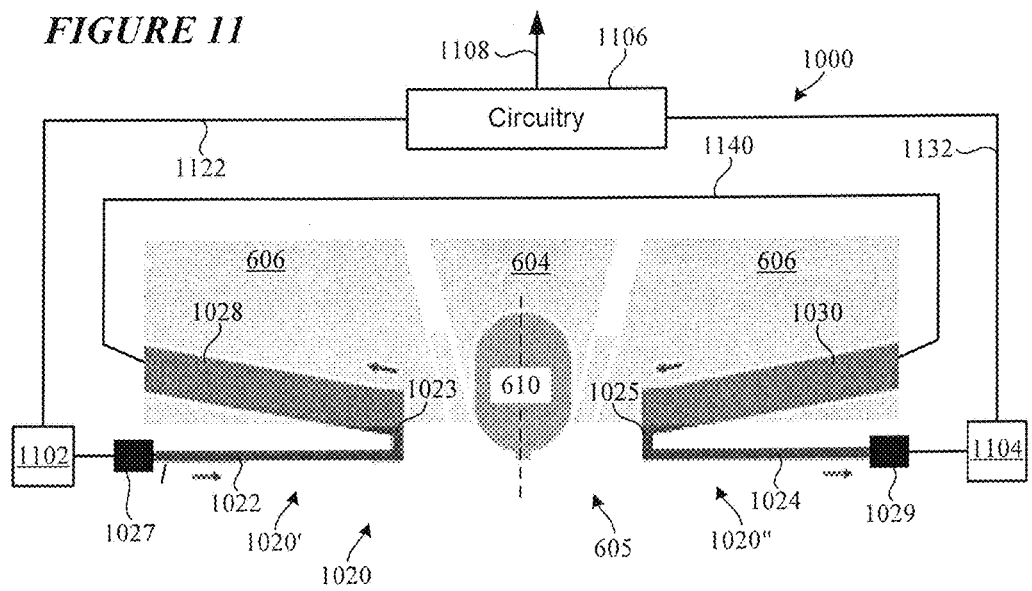
FIG. 11 illustrates the portion of the slider shown in FIG. 10, with additional circuitry coupled to the bolometric sensor in accordance with various embodiments.

FIG. 11 illustrates the portion 1000 of the slider shown in FIG. 10 with additional circuitry coupled to the bolometric sensor 1020 in accordance with various embodiments. The electrical circuit shown in FIG. 11 includes first and second wires 1022 and 1023 of the first wire sensor 1020' respectively connected to first and second leads 1027 and 1028.

The electrical circuit also includes first and second wires 1024 and 1025 of the second wire sensor 1020" respectively connected to first and second leads 1029 and 1030. The first lead 1027 couples the first wire sensor 1020' to electrical bond pad 1102, and the first lead 1029 couples the second wire sensor 1020" to the electrical bond pad 1104. The first and second wire sensors 1020' and 1020" are coupled in series via conductor 1140 respectively connected to second leads 1028 and 1030. Circuitry 1106 is coupled to the first and second bond pads 1102 and 1104 via conductors 1122 and 1132, respectively.

The circuitry 1106 is configured to communicate a signal 1108 indicative of slider flying height/contact and/or laser output optical power and changes thereof to other electrical or electronic components of the hard drive. In some embodiments, fly height measurements and contact detection can occur at times when laser power monitoring is not being conducted, and vice versa. In some embodiments, the circuitry 1106 can be configured to discriminate between signals produced from fly height measurements/contact detection and those produced from the laser power monitoring in a manner previously discussed. The bolometric sensors 1020' and 1020" can be connected to bond pads 1102 and 1104 exclusively or in a bond pad sharing relationship with one or more other components of the recording transducer.

All of the aforementioned designs can improve proximity of a bolometric sensor relative to the NFT and write pole over conventional implementations. In addition, positioning of the bolometric sensor proximate the light path at the ABS allows the bolometric sensor to absorb wasted light that would otherwise exit the ABS and broaden the media thermal profile. Modeling has produced laser-induced head temperature contours demonstrating that bolometric sensor temperature is dependent on the incident laser output optical power, though the presence of the bolometric sensor does not significantly affect NFT temperature.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider configured for heat-assisted magnetic recording;
   an optical waveguide formed in the slider and configured to receive light from a laser source;
   a near-field transducer (NFT) formed on the slider at or near an air bearing surface (ABS) of the slider and optically coupled to the waveguide;
   a writer adjacent the NFT; and
   a bolometric sensor positioned at or near a writer close point and exposed to at least some of the light, the bolometric sensor configured to detect changes in output optical power of the laser source, changes in spacing between the slider and a magnetic recording medium, and contact between the slider and the recording medium.

2. The apparatus of claim 1, wherein the bolometric sensor is coupled to a single pair of electrical bond pads of the slider.

3. The apparatus of claim 1, wherein the bolometric sensor is coupled to a single pair of electrical bond pads of the slider and to at least one other component of the slider.

4. The apparatus of claim 3, wherein the at least one other component comprises a reader.

5. The apparatus of claim 1, wherein the bolometric sensor is configured to concurrently detect changes in output optical power of the laser source, changes in spacing between the slider and the recording medium, and contact between the slider and the recording medium.

6. The apparatus of claim 1, wherein the bolometric sensor is configured to:
   detect changes in output optical power of the laser source during a first mode; and
   detect contact and spacing changes between the slider and the recording medium during a second mode.

7. The apparatus of claim 1, wherein the bolometric sensor is configured to:
   produce a first output signal indicative of contact and spacing changes between the slider and the recording medium; and
   produce a second output signal indicative of output optical power of the laser source; and
   the apparatus comprises circuitry coupled to the bolometric sensor and configured to discriminate between the first output signal and the second output signal.

8. The apparatus of claim 1, wherein the light impinging on the bolometric sensor comprises light that would otherwise exit the ABS as wasted light.

9. The apparatus of claim 1, wherein exposure of the light on the bolometric sensor has a negligible effect on NFT temperature.

10. The apparatus of claim 1, wherein the bolometric sensor is configured to reduce background heating of the recording medium proximate the apparatus relative to the apparatus lacking the bolometric sensor.

11. An apparatus, comprising:
    a slider configured for heat-assisted magnetic recording;
    an optical waveguide formed in the slider and configured to receive light from a laser source;
    a write pole at or near an air bearing surface (ABS) of the slider;
    a near-field transducer (NFT) formed on the slider at or near the ABS and optically coupled to the waveguide, the NFT positioned adjacent the write pole; and
    a bolometric sensor positioned at or near the ABS so as to be exposed to light that would otherwise exit the ABS as wasted light, the bolometric sensor configured to detect changes in output optical power of the laser source, changes in spacing between the slider and a magnetic recording medium, and contact between the slider and the recording medium.

12. The apparatus of claim 11, wherein the bolometric sensor is situated at or immediately adjacent to a thermally actuatable region of the slider that includes the write pole and the NFT.

13. The apparatus of claim 11, further comprising circuitry coupled to the bolometric sensor, the circuitry configured to detect a change in voltage or current corresponding to a change in temperature resulting from the changes in output optical power the changes in spacing and contact between the slider and the recording medium.

14. The apparatus of claim 11, wherein the bolometric sensor is coupled to a single pair of electrical bond pads of the slider.

15. The apparatus of claim 11, wherein the bolometric sensor is coupled to a single pair of electrical bond pads of the slider and to at least one other component of the slider.

16. The apparatus of claim 11, wherein the bolometric sensor is configured to concurrently detect changes in output optical power of the laser source, changes in spacing between the slider and the recording medium, and contact between the slider and the recording medium.

17. The apparatus of claim 11, wherein the bolometric sensor is configured to:
  detect changes in output optical power of the laser source during a first mode; and
  detect contact and spacing changes between the slider and the recording medium during a second mode.

18. The apparatus of claim 11, wherein the bolometric sensor is configured to:
  produce a first output signal indicative of contact and spacing changes between the slider and the recording medium; and
  produce a second output signal indicative of output optical power of the laser source; and
  the apparatus comprises circuitry coupled to the bolometric sensor and configured to discriminate between the first output signal and the second output signal.

19. A method, comprising:
providing relative movement between a magnetic recording medium and a slider configured for heat-assisted magnetic recording;
thermally actuating a region of the slider that includes a write pole and a near-field transducer (NFT);
sensing, using a bolometric sensor positioned at or near the thermally actuated region, changes in output optical power of a laser source and changes in spacing between the slider and the recording medium; and
detecting contact between the slider and the recording medium using the bolometric sensor.

20. The method of claim 19, comprising:
producing, by the sensor, a first output signal indicative of contact and spacing changes between the slider and the recording medium;
producing, by the sensor, a second output signal indicative of output optical power of the laser source; and
discriminating between the first output signal and the second output signal.

* * * * *